United States Patent [19]

Metzger

[11] 4,241,806
[45] * Dec. 30, 1980

[54] NOISE ATTENUATION PANEL

[76] Inventor: Arthur C. Metzger, 16 Forty Acres Dr., Wayland, Mass. 01778

[*] Notice: The portion of the term of this patent subsequent to Mar. 14, 1995, has been disclaimed.

[21] Appl. No.: 950,189

[22] Filed: Oct. 10, 1978

[51] Int. Cl.³ .............................................. E04B 1/82
[52] U.S. Cl. .................................. 181/284; 181/286; 181/288; 181/292; 181/294; 428/117; 428/312
[58] Field of Search ............... 181/284, 288, 290, 292, 181/294, 296, 286; 264/40.1; 428/308, 116, 117, 312

[56] References Cited

U.S. PATENT DOCUMENTS

| | | | |
|---|---|---|---|
| 2,192,516 | 5/1940 | Cunnington | 181/290 X |
| 2,363,068 | 11/1944 | Leadbetter | 181/292 X |
| 3,061,491 | 10/1962 | Sherrard et al. | 181/290 |
| 3,549,468 | 12/1970 | Messineo et al. | 428/117 |
| 3,620,906 | 11/1971 | Hannes | 181/290 X |
| 3,632,703 | 1/1972 | Sullivan et al. | 264/40.1 |
| 3,769,767 | 11/1973 | Scott | 181/288 |
| 3,788,937 | 1/1974 | Lee | 181/290 |
| 3,919,445 | 11/1975 | Smarok | 428/116 |
| 4,013,810 | 3/1977 | Long | 428/308 |
| 4,079,162 | 3/1978 | Metzger | 428/308 |

Primary Examiner—L. T. Hix
Assistant Examiner—Benjamin R. Fuller
Attorney, Agent, or Firm—Leon Nigohosian; Carl P. Steinhauser

[57] ABSTRACT

A laminated noise attenuation panel for both sound absorption and sound transmission loss having as its principal layers an expanded thermoplastic core with alternately inverted cavities, half opening to each side of said core and a sheet of cured resinous material having hollow microspheres with substantially reduced atmospheric pressure randomly dispersed in said resinous material, said cured resinous sheet facing away from the noise source. The cavities of said core panel facing away from said noise source may be filled with cellulose. The side of said core panel toward the noise source may include a laminated layer of a perforated material and a decorative layer. The side of said panel away from the noise source may also include a layer of other materials and a decorative layer. Data for the noise attenuation properties of various combinations of laminations are presented.

12 Claims, 5 Drawing Figures

NOISE ATTENUATION PANEL

BACKGROUND OF THE INVENTION

1. Field of the Invention

The present invention relates in general to sound or noise attenuating materials and structures primarily for use in the control of noise and noise pollution, but also for use as a thermal insulators and for auxiliary uses in the medical and construction fields, and wherever it is necessary to attenuate sound or noise emission or transmission. More particularly, the present invention is directed to an improved noise attenuation panel which includes as a component thereof a compound that can be fabricated, formed, and cured in a variety of forms and shapes to provide relatively thin surfaces which yield substantial noise attenuation. The compound is a composite type consisting of an adhesive binder-base having an elastic inter-molecular structure providing elastic wave attenuating properties and individually encapsulating in an homogeneous mixture a plurality of hollow microspheres having a substantially reduced atmosphere therein.

The present invention also pertains to the field of laminated structures, and in particular to those laminated structures used for insulation both thermal and acoustical.

Noise attenuation as used herein includes both sound absorption and sound transmission loss.

2. Description of the Prior Art

This invention pertains to noise attenuation structures which utilize the acoustical compound disclosed in U.S. Pat. No. 4,079,162 issued to applicant and improved varieties of that compound. In the present invention, that compound is combined with various other elements to form laminated structures which are effective in improving sound absorption and sound transmission loss. Sound absorption is the reduction of reflected noise waves within the area in which a noise source is confined. Sound transmission loss is the reduction of noise passing through a barrier between the noise source and the listener.

Traditional and commercially available structures which perform these functions with a reasonable degree of effectiveness are bulky, heavy structures, the most widely sold at present weighing twenty pounds per square foot and being four inches thick. Using the laminated panel of this invention, the weight can be reduced to six to eight pounds per square foot and the thickness can be reduced to one to two inches.

Noise pollution has become an ever increasing problem within recent years. Because of the increasing interest by environmentalists, as evidenced by the enactment of governmental regulations, there is an increased requirement to protect from and/or restrain sound emission. There are techniques available to achieve sound reduction or confinement, but these techniques have certain limitations or disadvantages associated therewith.

Noise or sound in the audio frequency range is transmitted by the interaction of molecules of gas or mixture of gases such as air. Noise in the audio frequency range may be transmitted through a rigid partition, such as a wall, by forcing the partition into vibration. A vibrating partition becomes a secondary source radiating sound to the side opposite the original source. Over a large portion of the audio frequency range of 128 to 2048 Hz, approximately 4 to 5 db is lost each time the weight of the partition is doubled.

It is further known that a governing material principal is $(r)^2 + a + (t)^2 = 1$; that is, the total energy impinging on a barrier will be partly reflected $(r)^2$, partly absorbed $a$, and partly transmitted through the material $(t)^2$. It is also known that each time an elastic wave passes through the surface of one medium to another, and if the densities of the media are different, there will be a refraction of the wave. It is the distinct purpose of the present invention to substantially reduce reflection $(r)$ and to increase absorption $(a)$ substantially over the prior art. Thus rather than reflect and transmit sound waves, the present compound acts to absorb sound waves superior to the prior art.

The majority of the prior art has relied upon one or more of three properties of materials, those being thickness, density and porosity, to achieve varying levels of sound wave attenuation in acoustic materials. The usual process to obtain improved acoustic attenuation is to increase the thickness of a wall or partition. However, there are disadvantages associated with this practice such as the attendant cost increase, weight increase and massive thickness. It has been customary to depend on not only thickness, but also density and porosity to achieve varying levels of elastic wave attenuation in acoustical materials, but the better performing attenuating materials are extremely dependent upon thickness and density.

Accordingly, it is an object of the present invention to provide a noise attenuation material and laminated noise attenuation structure that can provide an effective sound attenuation structure while being relatively thin and light in weight. The present invention uses the principles of two physical phenomena. These are utilized, in combination with the techniques of the prior art, to significantly enhance the inherent sound attenuation characteristics of the acoustical material and laminated structures of the present invention.

The first of such phenomena is that a sound wave has "elastic" properties in its behavior. It is known that an elastic wave will tend to set in motion the molecules of a substance upon which it impinges. The impinged material will tend to move as a direct function of the impinging wave. It is also known that the impinged material will, depending on its resonant characteristics, absorb varying amounts of the energy contained in the sound wave due to this natural phenomenon. Hence, a material having improved sound attenuating characteristics should be a material having a very good low frequency (100 to 2000 Hz) vibration/shock absorption properties. Such a material should be relatively soft, flexible and elastic in its behavior in the presence of acoustical or sound waves.

A second and most obvious phenomenon is the fact that audio frequency sound waves are dependent upon the existence of gaseous molecules for the transmission of sound. A reduction of air pressure or density of the gaseous environment will reduce the efficiency of sound transmission through the medium. Sounds cannot be transmitted through a vacuum. This phenomenon leads to the use of hollow microspheres, having reduced atmospheric pressure therein. The lower the atmospheric pressure within said microspheres, the more efficient the material containing the microspheres will be. Obviously also, the greater the number or volume of hollow microspheres within the material binder, the more efficient the sound attenuating compound will be.

Therefore, as the interior atmospheric pressure within the microspheres approaches a vacuum, the sound attenuation material densely packed with said microspheres will reach its maximum efficiency. Also the compound of the present invention is mixed and prepared so as to exclude substantially all free air.

To the inventor's knowledge only one prior art patent, U.S. Pat. No. 3,632,703 Sullivan et al, utilizes an acoustical material substantially similar to that used in the present invention. Its purpose is to provide an acoustical window with a predetermined impedance and density; that is, a material with a velocity of acoustic propagation and density equal to that of sea water.

The key differences between the acoustical compound used in the present invention and Sullivan's disclosure are inter-molecular elasticity of the material, the means and methods of construction and the ultimate results achieved. Sullivan does not appear to be concerned, as is the present invention, specifically with the attenuation of sound. The present invention relies upon and utilizes the difference of the refraction caused by its components, substantially due to the hollow microspheres, whereas Sullivan is concerned only with the velocity of acoustic propagation and its interrelation with density.

The prior art relates the use of polyurethane resins to provide the matching of Sullivan. Sullivan notes that such materials deform easily. Thus his invention simply used a limited number of capsules to decrease the density of a higher density and more rigid resin, combined with a hardener, which were, after preliminary curing, subjected to pressures of 5000-30,000 psi to cause a fracturing of a predetermined number of capsules. This increased the density of the material and causes it to have an acoustic propagation equal to water in a known pressure range. Where the capsules are frangible glass spheres, a great percentage of the capsules are fractured. Sullivan uses ratios of 88% resin base, 6.2% capsules and 5.8% hardener, by weight. The present invention uses one part resin base to 1 to 4 parts microspheres by volume in its acoustical material which is only one layer in the laminated noise attenuation panel.

The microspheres in Sullivan, being substantially uniform in size, range in size from 20 to 80 microns and are uniformly distributed throughout the resin. In the present material they range in size from 10 to 250 microns, and the various sizes are mixed randomly to improve the dispersion of acoustic waves within the material and within the panel if used elsewhere. Also in contrast, the present invention preferably has no spheres in contact with each other in its acoustical compound.

The application of pressure to the material of Sullivan also entraps gas molecules in the partially cured compound when the spheres are fractured to increase the density. In contrast, the fracturing of microspheres or the introduction of a gas or air into the compound material of the present invention is detrimental to its performance. The compound then would not as effectively deter the passage of sound waves through the materials due to the entrapped gas molecules transmitting the wave and due to the loss of a surrounding refractory boundary.

The present invention seeks to minimize reflection from the surface of the noise attenuation panel and compound, to increase absorption of the panel and to minimize transmission of waves to other surfaces. As illustrated in the figures and described in the specification of U.S. Pat. No. 4,079,162, every time a sound wave impinges on the barrier of new material, it is reflected, absorbed and retransmitted. The inventor herein utilizes these phenomena and has developed the novel laminated panel of this disclosure accordingly. In fact, the present disclosure wants the refraction and absorption phenomena to happen an infinite number of times within a high impedance material and other layers in the lamination until, theoretically at least, all the acoustical energy is dissipated into heat energy, whereas Sullivan simply sought a material which would create a low impedance window having a fixed acoustic propagation identical to water. Given these different goals, Sullivan uses an extremely hard and dense compound. The present invention uses as one element in its structure a soft, flexible and less dense compound, its binder having an elastic inter-molecular structure in the cured state in contrast to the rigid inter-molecular structure of Sullivan. The adhesive binder-base material acts as a shock wave absorber. In mechanics, a good shock wave absorber has flexure and resistance to reaction to the impinged mechanical energy. The same is true for acoustics. Once an acoustical wave impinges on the surface of a material, it is the ability of the material to respond as a shock absorber that transfers the mechanical energy of the sound wave into dissipating heat energy.

In contrast, the rigid system of Sullivan provides a highly reflective and transmissive component identical to water with minimal or no absorbative component contemplated.

Thus the present laminated panel exhibits sound attenuating properties heretofore unexpected. The combination of materials yields a structure which substantially reduces reflection of sound from its surface to a minimum and substantially increases refraction and absorption of sound waves within the structure, thus dispersing and transposing the same into heat energy.

SUMMARY OF THE INVENTION

The present invention relates to noise attenuation structures and materials and particularly to a laminated panel which exhibits substantial sound attenuating characteristics, heretofore unexplained and undisclosed while using a minimum of materials. The laminated panel includes a layer of a compound characterized by having a low density and comprised of a curable adhesive binder-base, having outstanding wave attenuation properties, which individually encapsulates a plurality of hollow microspheres having a reduced atmosphere therein. Keeping in mind that air transmits sound, as previously stated, it is an object of U.S. Pat. No. 4,079,160 to exclude all gases or free air from the cured compound, thus reducing transmission of sound. It is an object of this invention to have the reflection of sound waves off the surface of the compound, in its desired shape, be minimal; thus the main object of the invention is to have the compound in the laminated structure in conjunction with other materials theoretically absorb substantially all sound waves and, by a process of continuing refraction within the structure, dissipate the same into heat energy.

From the prior discussion of the theoretical basis of U.S. Pat. No. 4,079,160 it can be seen that there are two basic components of the improved sound attenuation material used in the present invention. The first is an adhesive binder-base which is relatively soft, flexible and elastic. The desired characteristics are stated in the specification and summarized in Table I of U.S. Pat. No. 4,079,160, wherein properties of some commercially available products meeting these desired characteristics are listed. The second principal component is the hollow microspheres having a significantly reduced atmospheric pressure therein. The desired characteristics are stated in the specification and summarized in Table II of that patent in relation to commercially available products.

The sound attenuating characteristics of that patent are dependent upon the type of adhesive binder-base used and the properties and volume of microspheres used in the mixture. The microspheres also provide structural rigidity. Accordingly, in that patent the base material that comprises the soundproof structure is preferably a curable elastic wave attenuator adhesive binder-base having soft, flexible inter-molecular characteristics, which correlates to an A or low D scale Shore indentation hardness. There are several epoxy resins, polyurethanes, and RTV silicones that have the desired shock/vibration isolation properties, flexure and Shore hardness. In accordance with that patent it has been found that the material should be selected so that in its cured, unfilled state (without glass spheres) it is relatively soft and flexible with a Shore rating on the order of A25. Experimentation has shown that as long as there is a reasonable degree of softness and flexibility, desirable results occur. Acceptable Shore hardness ranges on the order of A25 to as high as A100 (D60). When the spheres are used in the final product, the product assumes a stiff shape. It is desirable to have the binder-base viscosity as low as possible. It has been found that the viscosity should preferably be less than 10,000 centipose. Thus it is desirable to utilize a binder material having a low viscosity because greater amounts of microspheres may be added and uniformly mixed to create optimum sound attenuation. It is also desirable that the specific gravity be as low as possible so that the compound is lightweight.

Secondly, the compound contains hollow microspheres having an interior reduced atmospheric pressure. It is desired that the microspheres have ½ or less entrapped atmosphere thus reducing the transmission of sound waves. It is known that a vacuum dissipates sound waves, but microspheres having a vacuum are not commercially produced or technologically available. It is also desirable that the size of the microspheres be no larger than 250 microns. Preferably the microspheres will range in size from 10-250 microns and be randomly dispersed throughout the compound to increase the amount of refraction and vary the wavelengths. Also it is a prime consideration that the skin thickness of the microspheres be as thin as practically possible. The wall thickness is preferably on the order of two microns or less. By making the wall or skin-thickness of the sphere small, there is a greater vacuum volume. Furthermore the microsphere walls create a plurality of refractory boundaries surrounded by the elastic binder which further compounds the refraction.

In a typical cross section of the compound of U.S. Pat. No. 4,079,160, the hollow microspheres, being of random sizes, are randomly dispersed and fixed throughout the binder material. They are individually separated from each other by the flexible elastic binder material. A sound wave impinging the front surface of the cured compound will be partly reflected, the remainder will cause a compression of the flexible elastic material with a portion of the wave being absorbed by it, while the majority of the wave will be refracted and passed on into the cured compound. It is the compressibility and elastic property of the select binder that determines the transmission loss of the material as a function of the impinging frequency of the sound wave. The majority of the sound, as it penetrates the surface of the material, will be refracted by the binder-base and microspheres. The amount of refraction is a function of the differences in densities of the two materials. The differences in densities between the binder, the hollow microspheres, and the entrapped reduced atmospheric pressure within the microspheres causes a continuing process of refraction, reflection, and absorption within the cured compound. Some of the energy will travel through the surface skin of the microspheres, some will be reflected and some will enter the sphere. A wave entering the microspheres is subjected to further loss of energy because of the reduced atmosphere within the microsphere. Thus the wave energy will be alternately entering binder and microspheres creating refraction, reflection, absorption and dispersion of the wave as it moves through the sound attenuating cured compound. It has been found that the larger the percentage of spheres by volume in the compound, the greater the attenuation of sound. This is due to a larger vacuum volume and the larger number of transitions a wave must undergo within the compound between materials having differing indexes of refraction. Accordingly, the spheres are disposed quite close to each other but preferably not touching each other. This arrangement is to be provided by thoroughly mixing or blending the microspheres and the not yet cured binder-base. The uncured compound may be free flowed into and formed by a mold and then cured by heating into various shapes and configurations. The compound may also be used in its uncured state in spray or putty form and cured in the air. It is preferred, when using the compound in spray or putty form, that the components of the compound be maintained separately and then mixed by an appropriate means immediately prior to application due to the short shelf life of the compound in its uncured state.

The prime purpose of the material disclosed in U.S. Pat. No. 4,079,160 is to provide a high degree of sound attenuation. The properties of the essential ingredients have been specified within acceptable ranges in the specification to achieve the desired performance of the compound. Other ingredients may be utilized such as fire retardant chemicals, drying agents, thixotropic agents, flexizers, dyes, etc., in specific combinations without materially affecting the sound attenuating properties. Further high density materials may be utilized to improve the sound attenuating properties at the expense of increased cost and weight. Thus, it is possible to use powdered aluminum or other equally dense material interspersed, layered, or laminated within or to the compound as a complementary filler. These additions are dependent upon the particular requirements of the desired sound attenuation application of the invention.

It has also been found in accordance with this patent that good transmission loss or attenuation can be provided at a relatively thin thickness of the compound in its desired form. Although increased thickness of the product provides an increase in attenuation, the maximum efficiency use of materials occurs at about a thickness of one-eighth of an inch.

Thus the compound of that patent is a vast improvement over the prior methods and substances which are used as sound attenuators. The low reflectivity and high absorption of the binder-base in combination with the refractory and absorption character of the evacuated microspheres act in combination to produce these results. The compound is useful in many configurations and is readily workable with standard tools, as, for example, in the construction trades.

Not only is the compound an extraordinary sound attenuator, but it is also a good thermal insulator due primarily to the microspheres and the reduced atmosphere therein. It is also resistant to moisture or water deterioration, and dependent upon the binder-base and additives used, it has very acceptable natural flame retardant characteristics. Accordingly, it is an object of the present invention to provide a, laminated noise attenuation panel or sound barrier, or enclosure in any shape but preferably in the form of a panel, which utilizes the compound of that patent and enhances its acoustical properties and structural utility and provides good sound attenuation while being relatively thin and light and which can be manufactured very inexpensively.

The laminated noise control panel of the present invention is fabricated in its preferred embodiment in multiple layers, some of which are merely decorative and some of which are primarily for structural rigidity for construction of large noise control enclosures. These layers will first be described sequentially as seen in a finished panel beginning from the side which is exposed to the noise source. The first layer, which is optional and merely decorative can be a thin layer of a very light decorative material such as mylar or a wood-grained or colored plastic of similar materials. This layer should not be more than two mils thick to preserve the sound absorption properties of the panel. The next layer is a sheet of perforated steel to allow noise from the noise source to enter the structure of the panel, to provide structural rigidity and to provide some noise attenuation. The next layer is one of many honeycomb-like expanded core panels in which the cells are interlocked, alternately inverted cones or other geometric shapes. These expanded core thermoplastic panels are materials which have high compressive strength and flexure modules and which are energy absorbers. The process of making these cores is disclosed in U.S. Pat. No. 3,919,445 and the cores themselves are commercially available in a variety of shapes and strengths. In the laminated panel of the present invention, the expanded cores serve to provide structural rigidity primarily and some volume to the laminated panels so that relatively free-standing enclosures can be made from the panels. Preferably, the cores facing away from the noise source are filled with a loose insulating material such as cellulose, fiberglass or hollow microspheres to assist in noise attenuation by increasing the difraction of the sound wave impinging on the laminated panel. The next layer is a cast cured sheet of the noise attenuation material described in U.S. Pat. No. 4,079,162. Depending on the level of noise attenuation desired, this sheet can be from one-sixteenth to three-eighths inches in thickness, optimum cost-effectiveness being achieved by a sheet one-eighth inch thick. The next layer is another sheet of steel which provides structural rigidity and some noise attenuation. The final layer, which is optional, may be any decorative substance desired, since this side is away from the noise source. Within the laminated panel itself, the best adhesive for securing the layers together (except the decorative layers) is the material disclosed in U.S. Pat. No. 4,079,162 formulated from a two-part, room temperature cure resin having the same physical properties as the resin disclosed in that patent. As an adhesive, the resin is diluted with any standard diluent such as toluene.

Acoustically, the core used in the laminated panel has no significant effect on noise attenuation. It provides a good mechanical structure and it can be manipulated to produce varying results. For optimum noise attenuation results, the cavities on the side away from the noise source should be filled.

The laminated noise attenuation panel of the present invention achieves significant reduction in noise levels, the precise reductions being a function of the thickness of the panel, the materials used in its construction, the various optional materials included in the panel and the frequency of the noise impinging on the panel. Test results are presented hereinafter in tabular form. By the use of these tables, the acoustical engineer can specify the precise laminated structure to attenuate a specific noise problem.

Further features and advantages will become apparent from the following specification as related to the attached drawings.

DESCRIPTION OF THE PREFERRED EMBODIMENT

Figure 1:
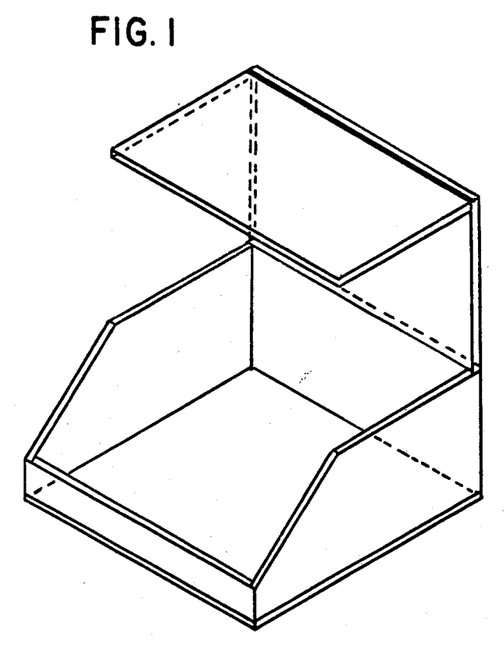
FIG. 1 is a perspective view of a noise attenuation structure configured to fit a typewriter, date entry or output keyboard/printer or similar type device made from the laminated noise attenuation panel of the present invention.
Figure 2:
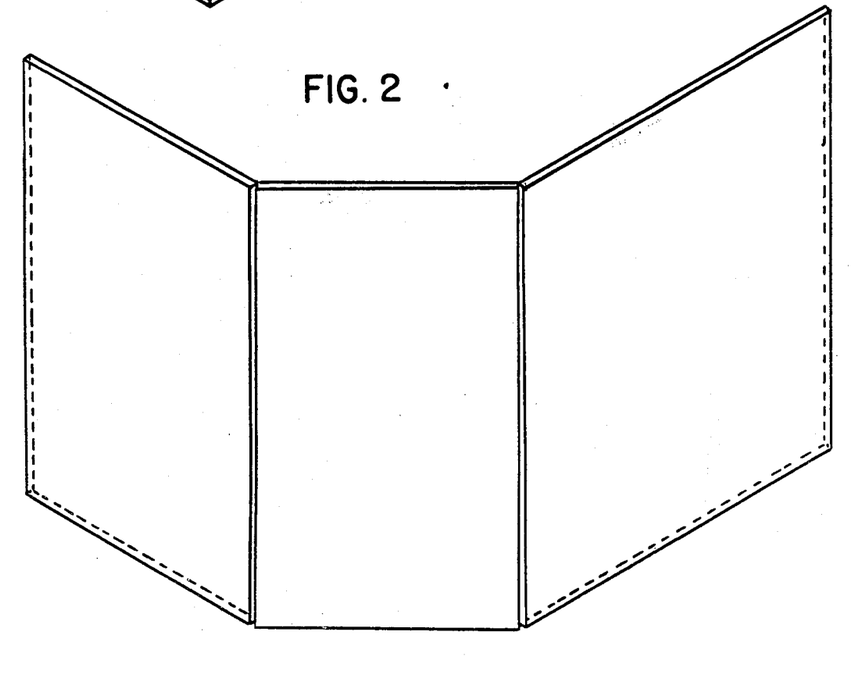
FIG. 2 is a perspective view of a telephone booth, made from the laminated panel of the present invention.
Figure 3:
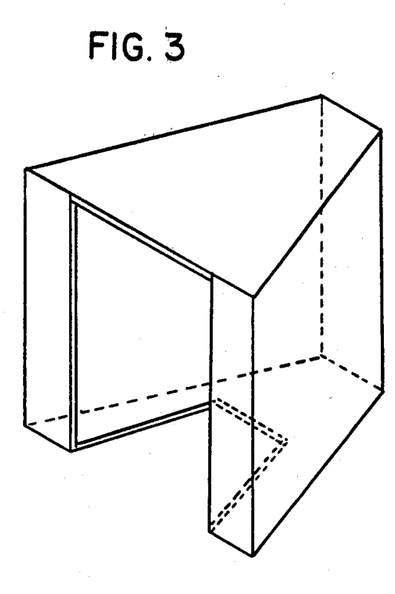
FIG. 3 is a perspective view of free-standing noise attenuation panels made from the laminated panel of this invention.

Referring now to the drawings, FIGS. 1, 2 and 3 are presented to illustrate the variety of noise attenuation structures which can be fabricated from the laminated noise attenuation panel of the present invention by varying the size, materials and shape of the panel while still using its basic principles and structure. FIG. 1 is a perspective view of a keyboard-printer enclosure which has been fabricated from relatively thin embodiments of the present invention. FIG. 2 is a perspective view of a telephone booth. This type of enclosure uses a relatively thick embodiment of the panel of the present invention. FIG. 3 is a perspective view of free-standing partitions constructed from the laminated panel of the present invention. These typical structures should clarify the reasons for the wide variety of materials used and the differences in noise attenuation levels desired to be achieved by the preferred embodiment.

Figure 4:
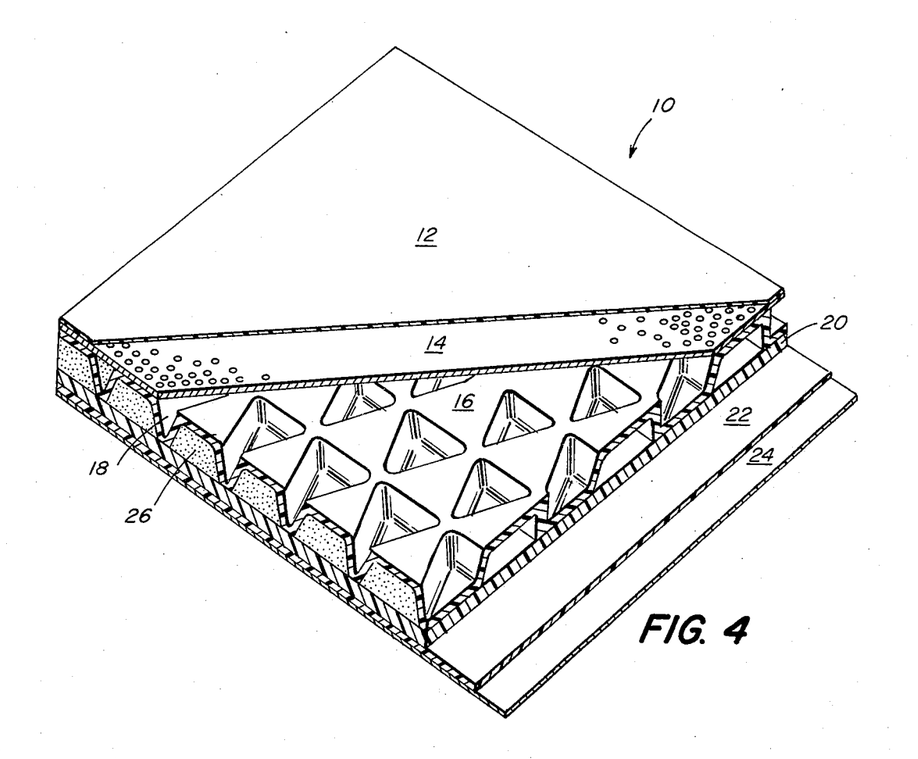
FIG. 4 is a cut-away view of the laminated panel of the present invention.
Figure 5:
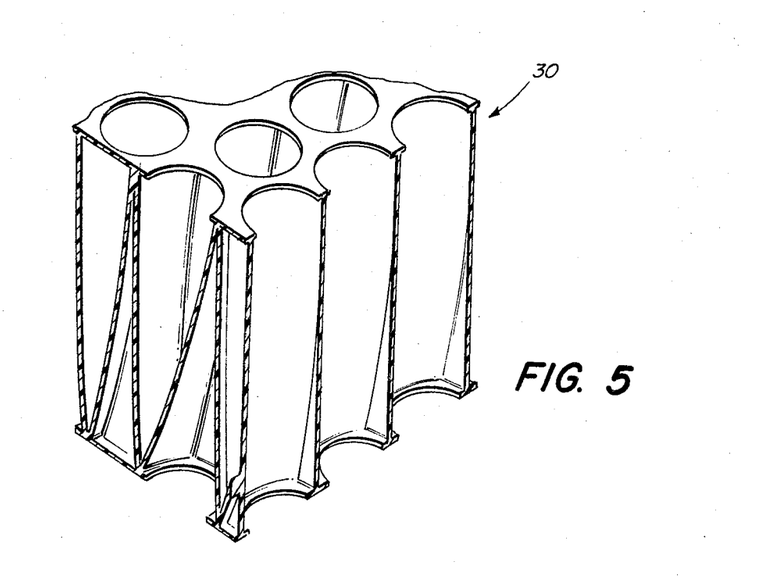
FIG. 5 is a perspective view of an alternate core structure for the laminated panel of the present invention.

FIG. 4 is a cut-away sectional view of a typical laminated noise attenuation panel 10 of the present invention. As illustrated in FIG. 4 the top layer 12 of the panel 10 is positioned toward the noise source. Layer 12, which is optional, is simply a decorative layer to improve the appearance of panel 10. Layer 12 should not be more than 2 mils in thickness to avoid degradation of the noise absorption of panel 10. Typically it could be a decorative self-adhesive plastic finish using any light and very thin material.

The second layer is a sheet of perforated steel 14, typically quite thin, such as a twenty-six gauge. This layer provides structural rigidity to the panel 10, some noise attenuation and some noise absorption by permitting parts of the sound waves to enter the structure of panel 10.

The next layer is an expanded core panel 16 fabricated from a thermoplastic in a honeycomb-like structure according to the process described in U.S. Pat. No. 3,919,445, and commercially available under a number of trademarks such as NorCore. These expanded cores are fabricated from a variety of different thermoplastic materials and in a variety of geometric shapes. The particular types preferred for the noise attenuation panel 10 of this invention are those panels which have alternate inverted cavities 18, half the cavities 18 opening to one side of the expanded core panel 16, and the other half opening to the other side of the expanded core 16. As will be described with reference to the Tables of test data which follow, the expanded core structures 16 have very little acoustical value in noise attenuation. In fact, at certain frequencies, some expanded core structures amplify noise rather than attenuate it.

Optionally, the cavities 18 of the expanded core structures may be filled with a filler 26 such as cellulose or the noise attenuation compound of U.S. Pat. No. 4,079,162. As the Tables presented hereinafter indicate, the optimum noise attenuation performance is obtained when cavities 18 facing away from the noise source are filled with cellulose.

Various layers of this panel may be secured to one another by an adhesive layer of the compound material of U.S. Pat. No. 4,079,162 formulated with a two-part, room temperature cure epoxy identical to the epoxy disclosed in that patent. Its prime purpose is to adhere layer 20 to the exapanded core layer 16.

Layer 20 is a sheet of the noise attenuation material of U.S. Pat. No. 4,079,162. While this sheet may be of varying thickness for different uses, optimum cost effectiveness is achieved with a sheet one-eighth of an inch thick. This size is used in all test results shown in the Tables which follow.

However, it should be noted that layer 20 could be of any thickness required to achieve the level of noise attenuation desired. In some uses, a coating of about one-sixteenth of an inch in thickness painted onto layer 22 has sufficed.

Layer 22 is a sheet of metal of approximately 26 gauge which is used for structural rigidity surface protection and noise attenuation. Aluminum or any other sheet metal could be used for layers 14 and 22, with some variation in noise attenuation which would be a function of the mass or density of the metal sheet.

Returning to filler 26, this filler adds mass to the panel and when used in one-half the cavities 18 facing away from the noise source, permits the other half of the cavities 18 facing the noise source to act as anechoic chambers.

Turning now to the Tables which follow, the following general comments apply. All expanded cores 16 were sold under the trademark NorCore and manufactured by Northfield Corporation, Danbury, Conn. Various different thermoplastics were used in the manufacture of NorCore panels including SURLYN, an ionomer resin made by Dupont; Uvex, a cellulose acetate butrate sheet made by Eastman Chemical; and LEXAN, made by General Electric. These trademarks are used in the Tables. NorCore panels are made by a process similar to that disclosed in U.S. Pat. No. 3,919,455. A discussion of expanded core panels appears in an article entitled "The Latest in Structural Plastic Panels" by Donald R. Dreger, published in Machine Design, June 10, 1976. Further information about NorCore panels appears in the data sheets of the manufacturer.

Another trademark used in the Tables is SMART which is the product disclosed in U.S. Pat. No. 4,079,162 issued to applicant. Smart is manufactured by SMART Products, Inc., Framingham, Mass.

Table 1 presents the noise attenuation (sound transmission loss) in decibels for sound attenuation panels 10 made according to the principles of this invention. The results of five tests are presented.

Table 1. Test 1. A NorCore panel made from SURLYN three and one-half inches thick was tested by itself. As the first row of data indicates, this NorCore panel provided little sound transmission loss at most frequencies and even a gain of +6 decibels at 500 Hertz. Thus, from 500 Hertz to 4000 Hertz, the expanded thermoplastic core has little acoustical value. Most industrial, commercial and even offensive domestic noise falls within this range.

Table 1. Test 2. The three and one-half inch NorCore SURLYN core 16 had cavities 18 on one side filled with a cellulose filler 26 and covered with a sheet of one-eighth inch SMART, layer 20, the cellulose and Smart facing away from the noise source. The data in row 2 indicates a significant improvement in noise attenuation over all frequencies except 63 Hertz (lower) and 125 Hertz (slight improvement).

Table 1. Test 3A. A sheet of aluminum, layer 22, 0.016 inches thick was laminated to the Smart layer 20, the core layer 16 facing the noise source and filler 26 and layer 22 facing away from the noise source. The data in row 3 indicates a significant improvement in noise attenuation at all frequencies except 63 Hertz.

Table 1. Test 3B. The panel 10 of Test 3A was turned around so that layers 20 and 22 faced the noise source. The data in row 4 indicates a degradation in performance from Test 3A at frequencies over 500 Hertz. This tends to indicate a loss of sound absorption in the panel 10 at higher frequencies.

Table 1. Test 4. The panel 10 of Test 3A had an additional layer of one-eighth inch thick SMART, layer 14 in FIG. 4, such that both sides of core 16 were covered by SMART. Additionally, all cavities 18 were filled with a cellulose filler 26. The data in row 5 indicates improved noise attenuation in the low frequency range of 63 to 500 Hertz, good attenuation from 1000 to 2000 Hertz and excellent performance from 4000 to 8000 Hertz.

Table 1. Test 5. Panel 10 of Test 4 was used without any cellulose filler 26. Layer 14 is SMART, layer 16 is SURLYN and layer 20 is SMART. All cavities 18 are empty or unfilled. This variation of panel 10 had the lowest performance of all the laminated panels used in Tests 2 through 5 of Table 1.

Table 1 shows that the panel 10 used in Test 3A had the best overall noise attenuation over all but the low frequencies. The data in Table 1 can be anticipated because cellulose adds mass to the panel and SMART adds noise attenuation in accordance with the graph of FIG. 3 of U.S. Pat. No. 4,079,162. (It should be noted, however, that the SMART panel of that Figure is three-eighths of an inch thick. Test results subsequent to the filing of the patent indicate an optimum cost-effectiveness at one-eighth inch thickness.) The panel 10 of Test 2 has a mass of 3.7 pounds per square foot. If the cellulose were omitted, the mass would be 1.56 pounds per square foot.

Table 2 shows test results from variations in the type of core panel 16 which can be used. All panels 10 have cores 16 of one inch thickness; when filler 26 is used, it is in cavities 18 facing away from the noise source; and all have a layer 22 of SMART on the side away from the noise source.

Table 2. Test 6A. Core 16 is made from high impact polystyrene (HIPS) and no filler 26 is used.

Table 2. Test 6B. Core 16 is HIPS and filler 26 is cellulose.

Table 2. Test 7. Core 16 is polypropylene and no filler 26 is used.

Table 2. Test 7A. Core 16 is polypropylene and filler 26 is cellulose. Data in row 4 indicates good to excellent noise attenuation over most frequencies.

Table 2. Test 8A. Core 16 is LEXAN and no filler is used.

Table 2. Test 8B. Core 16 is LEXAN and filler 26 is cellulose.

From the data in Table 2, the one inch thick expanded cores 16 of high impact polystyrene (HIPS), polypropylene and LEXAN, when filled (Tests 6B, 7B, 8B) out perform the three and one-half inch SURLYN (Test 2) at most frequencies up to 2000 Hertz. The LEXAN panel (Test 8B) had improved attenuation over all frequencies. This is probably because the one inch thick cores have thicker core walls than the three and one-half inch expanded cores.

Table 3 presents test results comparing SMART and cellulose as filler 26 in a panel 10 having a one-half inch thick core 16 of polypropylene and layer 20 of one-eighth inch thick SMART, the core 16 facing the noise source.

Table 4 presents test results for panel 10 having core 16 of one-half inch thick NorCore Uvex, layer 20 of one-eighth inch SMART, layer 16 facing the noise source, and the addition of metal layers to panel 10.

Table 4. Test 1. Cavities 18 are unfilled.

Table 4. Test 2. Cavities 18 have a cellulose filler 26 on the side away from the noise source.

Table 4. Test 11. Cavities 18 have a cellulose filler 26; layer 20 is SMART; layer 22 is 0.016 inch aluminum sheet.

Table 4. Test 12. Cavities 18 have a cellulose filler 26; layer 20 is SMART, layer 22 is 0.016 aluminum; and layer 14 is perforated (one-sixteenth inch hole) twenty-four gauge steel, with perforated layer 14 facing the noise source.

The data in Table 4 indicates that the variations of panel 10 used in Tests 11 and 12 differ in performance over various frequency ranges, the perforated steel being particularly helpful from 125 to 1000 Hertz, the frequencies of many industrial noises. It is important to recognize that core 16 is only one-half inch thick.

Table 5 presents test results for variations in the thickness and thermoplastic used in core 16. Each panel 10 has a core 16, a cellulose filler 26 in the cavities away from the noise source, and a one-eighth inch thick layer 20 of SMART. The test data of this table indicate that the choice of cores should be a function of the frequency of the noise source which requires attenuation.

Table 6 presents test results for comparison of cellulose and hollow microspheres as the filler 26. The hollow microspheres are those used in U.S. Pat. No. 4,079,162, Table II, Sample No. 1. Panel 10 in these tests had a core 16 of one-half inch thick LEXAN, a layer 20 of one-eighth inch SMART cavities 18 away from the noise source being filled. The core 16 and empty cavities 18 faced the noise source.

Table 7 presents further variation in filler 26 and core 16. Panel 10 has a core 16 of one-half inch thick polypropylene, cavities 18 facing away from the noise source being filled, a layer 20 of one-eighth inch SMART, core 16 facing the noise source.

Analysis of test data in all the Tables indicates that the general embodiment of FIG. 4 is the preferred embodiment. Decorative layer 12 is optional. Perforated metal layer 14 adds structural strength and in some cases noise attenuation. The type and gauge of the metal may be varied according to requirements of the noise attenuation problem to be resolved. Core 16 may be any of a variety of expanded core thermoplastics and of any thickness required by the design considerations and requirements of the noise problem. Layer 20 of the noise attenuation material of U.S. Pat. No. 4,079,162 (SMART) may be varied in thickness with corresponding variations in noise attenuation. A one-eighth inch thickness provides optimum cost-effectiveness on a cost per decibel attenuation basis. However, when the attenuation required is relatively low, thinner panels can be used or the compound can be painted on the core 16 or the metal layer 22. When painted, the noise attenuation compound of U.S. Pat. No. 4,079,162 is made from a two-part room temperature cured epoxy resin. Layer 22 is used primarily for structural strength and for some instances also for noise attenuation. The type of metal and the gauge can be varied according to requirements. Layer 24 is decorative and optional. Filler 26 performs a definite noise attenuation function when one-half the cavities of core 16 (those away from the noise source) are filled. Cellulose is the least expensive filler and is only out performed at certain frequencies and with certain core materials and sizes by microspheres or SMART compound. SMART compound may also be used as the adhesive for the laminations.

It should also be noted that layers 14 and 22 in the preferred embodiment were sheets of metal used primarily for structural strength. However, these layers could be any material having the strength and environmental qualities required for the specific use of panel 10. For example, wood, fiberboard or plastic sheets could be finished to provide a decorative surface without an additional decorative layer 24. Additionally many woods provide good structural strength and noise attenuation.

Noise attenuation panel 10 as described herein is a versatile panel capable of being fabricated into a variety of noise attenuation structures. Noise attenuation panel 10 will weigh between four to six pounds per square foot in the embodiments used in the Tables. This is a significant improvement over commercially available panels of equivalent noise attenuation which weigh from eight to twenty pounds per square foot.

TABLE 1

ATTENUATION (dB)
VARIATIONS IN FILLING AND COATING

| SURLYN CORE 3½ INCH THICK | Test Number | FREQUENCY IN HERTZ | | | | | | | |
|---|---|---|---|---|---|---|---|---|---|
| | | 63 | 125 | 250 | 500 | 1000 | 2000 | 4000 | 8000 |
| UNFILLED CORE ONLY NO COAT | 1 | 10 | 9 | 11 | +6 | 1 | 4 | 3 | 12 |
| SMART ONE SIDE CELLULOSE FILLED | 2 | 5 | 12 | 21 | 16 | 27 | 30 | 34 | 34 |
| .016A1 FACE OVER ⅛ INCH SMART CELLULOSE FILLED | 3A | 6 | 18 | 30 | 30 | 43 | 44 | 66 | 65 |
| 3A SMART TOWARDS NOISE | 3B | 9 | 25 | 39 | 31 | 37 | 30 | 42 | 35 |
| SMART TWO SIDES-FILLED BOTH SIDES | 4 | 11 | 30 | 38 | 36 | 32 | 33 | 58 | 56 |
| SMART - TWO SIDES - UNFILLED | 5 | 5 | 12 | 20 | 16 | 27 | 25 | 30 | 42 |

TABLE 2

ATTENUATION (dB)
VARIATIONS IN TYPE OF CORE

| 1 inch Thick - Filled one side cellulose - SMART COATED | Test Number | FREQUENCY IN HERTZ | | | | | | | |
|---|---|---|---|---|---|---|---|---|---|
| | | 63 | 125 | 250 | 500 | 1000 | 2000 | 4000 | 8000 |
| UNFILLED - HIPS | 6A | 0 | 14 | 31 | 21 | 22 | 17 | 2 | 18 |
| FILLED - HIPS | 6B | 5 | 22 | 27 | 26 | 27 | 13 | 22 | 21 |
| UNFILLED POLYPROPYLENE | 7A | 0 | 4 | 22 | 14 | 16 | 13 | 3 | 16 |
| FILLED POLYPROPYLENE | 7B | 7 | 28 | 42 | 30 | 35 | 45 | 37 | 22 |
| UNFILLED LEXAN | 8A | 0 | 8 | 32 | 30 | 19 | 8 | 3 | 10 |
| FILLED LEXAN | 8B | 7 | 29 | 44 | 39 | 28 | 29 | 38 | 52 |

TABLE 3

ATTENUATION (dB)
VARIATION IN FILLERS

| POLYPROPYLENE ¼" THICK ⅛" SMART | Test Number | FREQUENCY IN HERTZ | | | | | | | |
|---|---|---|---|---|---|---|---|---|---|
| | | 63 | 125 | 250 | 500 | 1000 | 2000 | 4000 | 8000 |
| UNFILLED | 10A | 7 | 36 | 41 | 20 | 21 | 15 | 30 | 31 |
| CELLULOSE FILLED SMART | 10B | 6 | 29 | 37 | 18 | 20 | 18 | 21 | 36 |
| FILLED | 10C | 3 | 36 | 38 | 29 | 26 | 26 | 21 | 31 |

TABLE 4

ATTENUATION (dB)
EFFECTS OF ADDING METAL TO CORE

| NORCORE - ⅛ INCH THICK - UVEX ⅛ INCH SMART | TEST NUMBER | FREQUENCY IN HERTZ | | | | | | | |
|---|---|---|---|---|---|---|---|---|---|
| | | 63 | 125 | 250 | 500 | 1000 | 2000 | 4000 | 8000 |
| UNFILLED | 1 | 4 | 32 | 40 | 30 | 28 | 25 | 23 | 30 |
| CELLULOSE FILLED | 2 | 7 | 35 | 49 | 25 | 26 | 31 | 41 | 40 |
| .016A1 FACE-OVER ⅛ INCH SMART CELLULOSE FILLED | 11 | 15 | 32 | 43 | 31 | 44 | 43 | 48 | 46 |
| ADDED TO PRIOR SAMPLE ON UNFILLED SIDE 1/16th INCH HOLE 24GA PERFORATED FACE TOWARD NOISE | 12 | 14 | 40 | 46 | 35 | 50 | 36 | 46 | 41 |

TABLE 5

ATTENUATION (dB)
VARIATIONS IN THICKNESS AND CORE MATERIALS

| NORCORE - FILLED ONE SIDE/CELLULOSE - ⅛" SMART COATED. | TEST NUMBER | FREQUENCY IN HERTZ | | | | | | |
|---|---|---|---|---|---|---|---|---|
| | | 125 | 250 | 500 | 1000 | 2000 | 4000 | 8000 |
| ½ INCH UVEX | 13 | 35 | 49 | 25 | 26 | 31 | 41 | 40 |
| 1 INCH LEXAN | 14 | 29 | 44 | 39 | 28 | 29 | 38 | 53 |
| 3½ INCH SURLYN | 15 | 18 | 30 | 30 | 43 | 44 | 66 | 64 |

TABLE 6

ATTENUATION (dB)
MICROSPHERES FILLER VS. CELLULOSE FILLER

| NORCORE ⅛ INCH THICK LEXAN ⅛ INCH SMART | TEST NUMBER | FREQUENCY IN HERTZ | | | | | | | |
|---|---|---|---|---|---|---|---|---|---|
| | | 63 | 125 | 250 | 500 | 1000 | 2000 | 4000 | 8000 |
| MICROSPHERES | 16 | 7 | 34 | 41 | 29 | 28 | 17 | 28 | 39 |
| CELLULOSE | 17 | 8 | 34 | 47 | 25 | 27 | 18 | 28 | 32 |

TABLE 7

ATTENUATION (dB)
VARIATIONS OF FILLERS

| NORCORE ⅛ INCH THICK POLYPROPYLENE ⅛ INCH SMART | TEST NUMBER | FREQUENCY IN HERTZ | | | | | | | |
|---|---|---|---|---|---|---|---|---|---|
| | | 63 | 125 | 250 | 500 | 1000 | 2000 | 4000 | 8000 |
| UNFILLED | 18 | 3 | 36 | 38 | 29 | 26 | 26 | 21 | 31 |
| SMART FILLED | 19 | 7 | 36 | 41 | 20 | 21 | 15 | 30 | 31 |
| CELLULOSE FILLED | 20 | 6 | 29 | 27 | 18 | 21 | 18 | 21 | 36 |

I claim:

1. A laminated noise attenuation panel comprising:
an expanded core thermoplastic panel having alternately inverted cavities approximately one-half of which open to each side of said panel; and
a panel of a noise attenuation material secured to said expanded core panel comprising randomly dispersed hollow microspheres having an interior pressure of one-third atmospheres or less in a cured low-viscosity adhesive binder material having an elastic inter-molecular structure yielding elastic wave attenuating properties.

2. The laminated noise attenuation panel of claim 1 further comprising:
a sheet of perforated material secured to the side of said expanded core panel facing a noise source.

3. The laminated noise attenuation panel of claim 2 further comprising:
a sheet of material adhered to the side of said layer of noise attenuation material away from the noise source.

4. The laminated noise attenuation panel of claims 1 or 2 further comprising:
a layer of decorative material adhered to at least one exterior side of said panel.

5. The laminated noise attenuation panel of claim 1 wherein
the Shore hardness of said binder, in the cured state, ranges from 25 to 100 on the A scale and has an uncured viscosity at ambient temperature of less than 10,000 centipose;
said binder being selected from the group consisting of epoxy resins, polyurethanes and RTV silicones; and
said microspheres have diameters ranging from 10 to 250 microns and a wall thickness of 2 microns or less;
said hollow microspheres having an interior pressure equivalent to one-third or less atmospheric pressure;
said hollow microspheres being a sodium borosilicate glass and being interspersed and encapsulated individually within said uncured adhesive binder to exclude substantially all free air and air bubbles from said compound;
the volume of randomly sized microspheres ranging up to 4 times greater than the volume of said binder.

6. The laminated noise attenuation panel of claim 5 wherein
the spheres comprise up to 75% by volume of said compound; and
said binder is a two-part material.

7. The noise attenuation panel of claim 1 further comprising:
a filler in at least one-half of the cavities of said expanded core panel.

8. The noise attenuation panel of claim 7 wherein said filler is cellulose.

9. The noise attenuation panel of claim 7 wherein said filler is said noise attenuation material.

10. The noise attenuation panel of claim 7 wherein said filled cavities open on the side of said core panel away from the noise source.

11. The noise attenuation panel of claim 2 wherein said perforated material is a metal sheet.

12. The noise attenuation panel of claim 3 wherein said sheet of material is a sheet of metal.

* * * * *